Sept. 8, 1936.  W. W. SAYERS  2,053,636
SETTLING TANK
Filed March 20, 1933  4 Sheets-Sheet 3

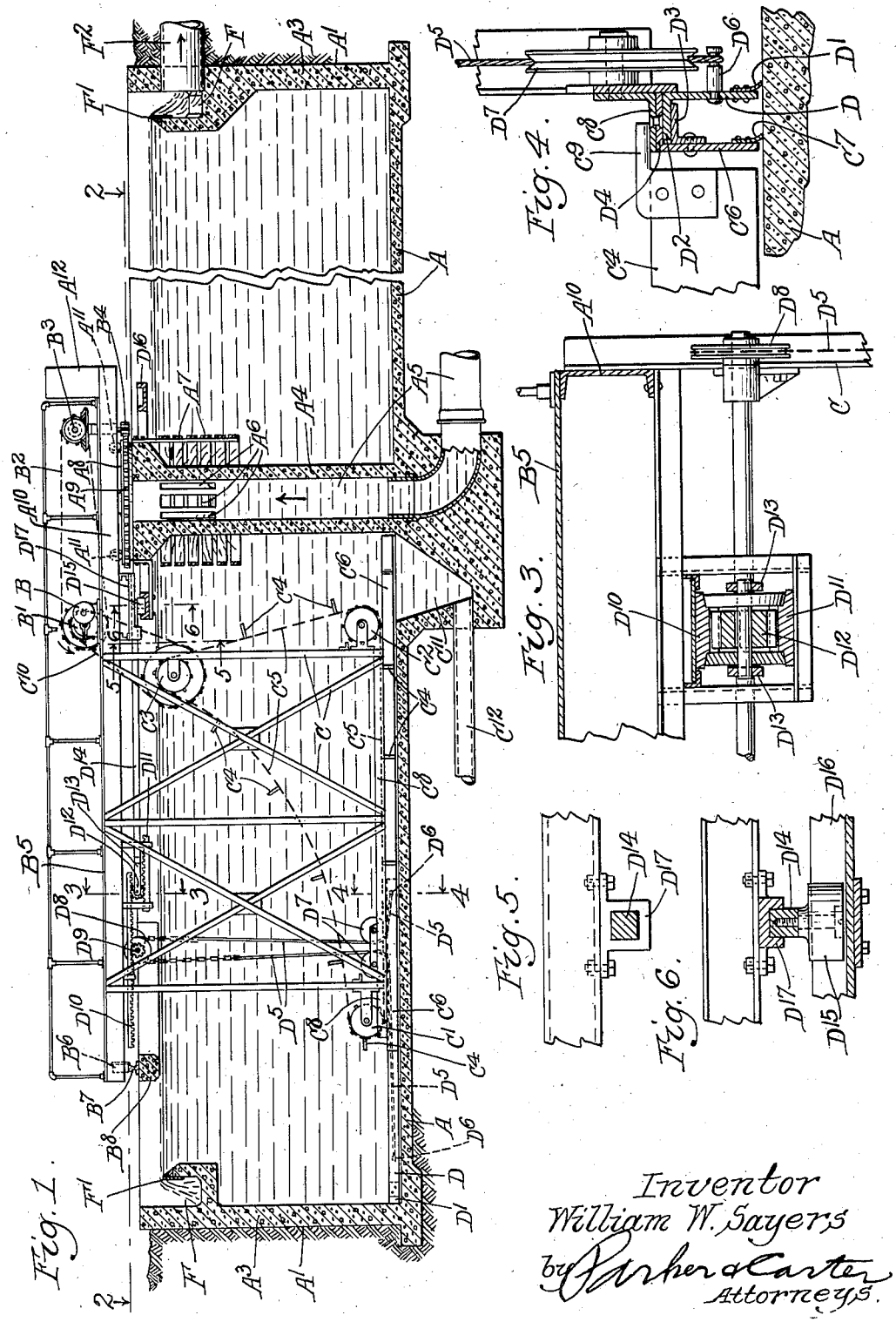

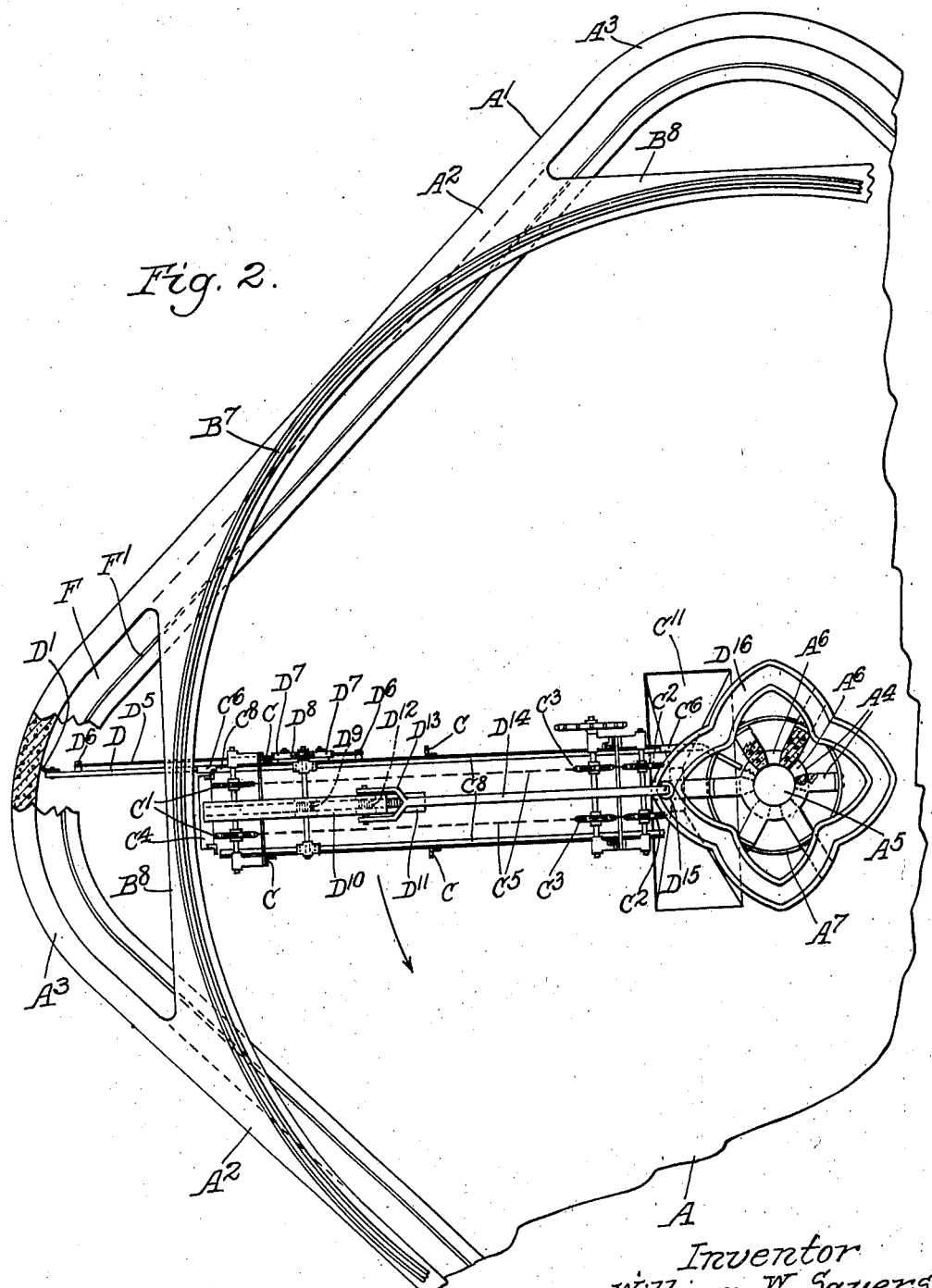

Inventor
William W. Sayers
by Parker & Carter
Attorneys.

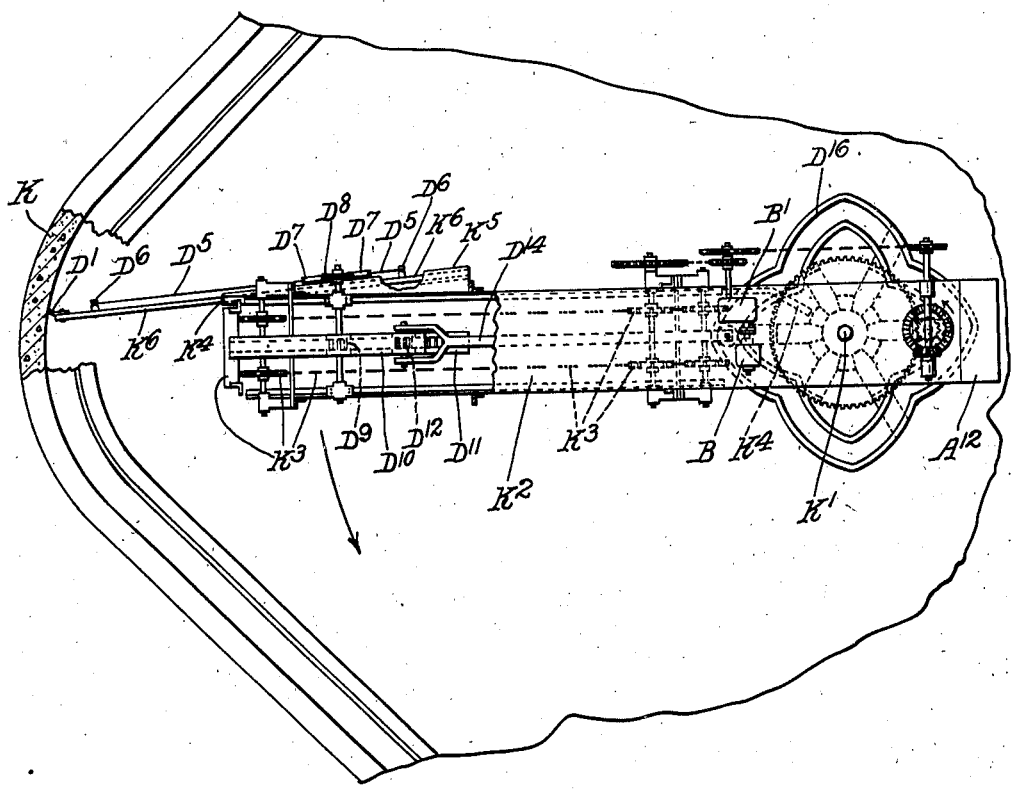

Patented Sept. 8, 1936

2,053,636

UNITED STATES PATENT OFFICE 2,053,636

SETTLING TANK

William W. Sayers, Chicago, Ill., assignor to Link-Belt Company, Chicago, Ill., a corporation of Illinois Application March 20, 1933, Serial No. 661,783

23 Claims. (Cl. 210—55)

My invention relates to improvements in settling tanks and especially in the means for cleaning the bottoms thereof. The invention is especially applicable to setting tanks of non-circular area. Such tanks ordinarily are rectangular, preferably square, with curved corners though they might take many other different irregular shapes. The cleaning of settling material in a circular tank is comparatively simple. All that is needed is to provide some kind of a sweeping arm which will rotate about a pivot within the tank and will have associated with it or carried by it conveyor means in one form or another such as is shown in my co-pending application and one complete rotation of the supporting arm will sweep the whole circular area. When, however, the area becomes other than circular, the problem becomes very different and special means must be provided if the cleaning is to be done by a sweeping device to cause an automatic controlled extension of the radial sweeping device in consonance with its angular position whereby a member will project into the tank beyond the circular area contained within and tangential to the walls thereof. I propose to accomplish this by means of a radially extensible member and a cam or cam-like mechanism located adjacent the center of rotation, there being interposed between this cam mechanism and the extensible member a suitable motion multiplying device whereby the extensible member may be projected and retracted as rotation of the sweeping member takes place.

My invention is illustrated more or less diagrammatically in the accompanying drawings, wherein—

Figure 1 is a section through the tank showing the working mechanism in side elevation;

Figure 2 is a section along the line 2—2 of Figure 1;

Figure 3 is a section along the line 3—3 of Figure 1 on an enlarged scale;

Figure 4 is a section along the line 4—4 of Figure 1 on an enlarged scale;

Figure 5 is a section along the line 5—5 of Figure 1 also on an enlarged scale;

Figure 6 is a section along the line 6—6 of Figure 1;

Figure 9 is a diagrammatic showing of a modified form.

Like parts are indicated by like characters throughout the specification and drawings.

Figure 7:
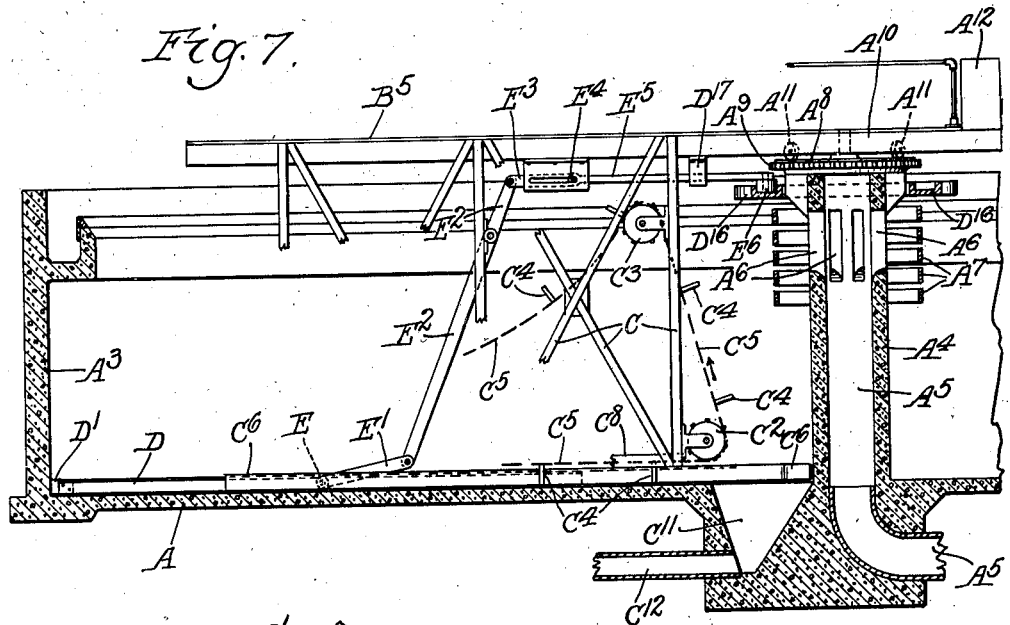
Figure 7 is a detail side elevation of a modified form of structure with parts omitted.

A settling tank having a relatively flat floor A and non-circular vertical walls $A^1$, in this instance as an example having four straight walls $A^2$ each perpendicular to its adjacent walls and joined by curved elements $A^3$ is provided with a central hollow pier $A^4$ into which discharges an influent pipe $A^5$. Fluid discharges to the tank through the ports $A^6$ from the pier $A^4$ and $A^7$ is a baffle cage fixed in position on and encircling the pier and spaced from the discharge ports. $A^8$ is a roller race on the top of the pier having associated with it a fixed gear $A^9$. $A^{10}$ is a bridge, there being anti-friction rollers $A^{11}$ interposed between the bridge and roller race. $A^{12}$ is a counterbalance at the short end of the bridge to balance it on the roller race. The bridge extends out radially from its center of rotation on the pier and may if desired when approaching perpendicularity to the sides $A^2$ of the tank actually overhang them.

B is a motor on the bridge. It drives a speed reduction gear $B^1$ which in turn by means of a gear and chain drive $B^2$ causes rotation of the shaft $B^3$, which in turn transmits power through the bevel gears and vertical shaft to a pinion $B^4$ in mesh with the gear $A^9$ to cause the bridge to revolve. $B^5$ is a walkway on the bridge which extends from the end of the bridge over the pier to the end adjacent the periphery of the tank. $B^6$ are rollers on the outer end of the bridge adapted to travel along a circular track $B^7$ which track is concentric with the pier and overlies in part the walls of the tank and is supported where it crosses the corners of the tank by any suitable structure $B^8$. This track may be used if it is desired to dispense with the counterbalance or may be used in addition to the counterbalance if desired, or the track and rollers may also be dispensed with without in any way affecting the operation of the device.

Depending downwardly from the bridge $B^5$ is a conveyor ladder C having sprockets $C^1$ $C^2$ and $C^3$ and a conveyor comprising flights $C^4$ and chains $C^5$, traveling over the sprockets. This ladder also carries a fixed screed $C^6$ having a flexible edge $C^7$ to engage the floor of the tank. This screed is located immediately adjacent the ends of the conveyor flights, which flights are supported in parallelism with and immediately adjacent the bottom of the tank by means of a track $C^8$ above the screed having supporting shoes $C^9$ riding along said track. The conveyor is driven by means of a chain drive as indicated at $C^{10}$ from the gear reducer $B^1$. The bridge ladder and screed swing about a center on the pier, the screed brushing or sweeping or scraping material along the bottom of the tank, piles it up in front of itself and in the path of the conveyor flights. The conveyor flights where parallel with the floor of the tank move inwardly to discharge settling material toward the sludge hopper $C^{11}$, in this case adjacent the center of the tank, whence sludge may be withdrawn through the pipe $C^{12}$. It will be noted from Figure 2 that the screed $C^6$ as it travels, covers or sweeps a circular area only, that this circular area is tangent to the walls $A^2$ and therefore a considerable area is left in each corner of the tank not swept by this screed. The sweeping of the area not swept by the screed $C^6$ is accomplished as follows:

D is an auxiliary screed or scraper blade or scraping means. In this case it comprises an angle member having a vertical working body terminating in a flexible edge $D^1$ and a horizontal guiding body $D^2$ guided between opposed guide members $D^3 D^4$ so that this auxiliary screed or scraper may move in a direction generally parallel with the main sweeping member. This movement is accomplished by cables $D^5$ anchored on lugs $D^6$ widely spaced along the axis of the auxiliary screed. These cables extend inwardly and travel about sheaves $D^7$ and thence upwardly where they are joined by a chain $D^{17}$ which travels over a sprocket $D^8$ on the bridge. $D^{11}$ is a fixed rack on the bridge and $D^{12}$ is a pinion in mesh with the racks $D^{10}$ and $D^{11}$. This pinion is carried in a fork or cross head $D^{13}$ on a rod $D^{14}$. The rod is slidably mounted on the bridge as in the guide $D^{17}$ and terminates at its inner end in a roller $D^{15}$ which engages a slot in the cam $D^{16}$, the cam being fixedly supported on the pier $A^4$. This arrangement gives a positive drive for the auxiliary screed in both directions.

The contour of the slot in the cam $D^{16}$ is such that as the bridge rotates, the roller traveling along the cam slot will cause a reciprocating movement of the rod and through the floating rack, fixed rack and floating pinion and through the pinion associated with the screed driving cable, this cam member will cause a longitudinal movement of the auxiliary screed or scraper in consonance with the rotation of the bridge to cause the auxiliary screed to be projected outwardly far enough and then withdrawn at the proper rate of speed to cause it to sweep that portion of the tank not swept by the main screed or scraper and the conveying means. Obviously the conveyor is not caused to extend into the non-circular area but the rotary movement of the bridge carrying with it the auxiliary screed will scrape material adjacent the bottom of the tank forwardly, the wall of the tank itself causing a relative inward movement to take place until such time as the bridge and main scraper becomes perpendicular to the wall at its point of closest approach, the auxiliary screed will have been entirely retracted and the material being pushed around in front of it by cooperation with it and with the wall and with the main scraper will be moved into such a position that the conveyor flights may continue the inward movement of such material.

Figure 8:
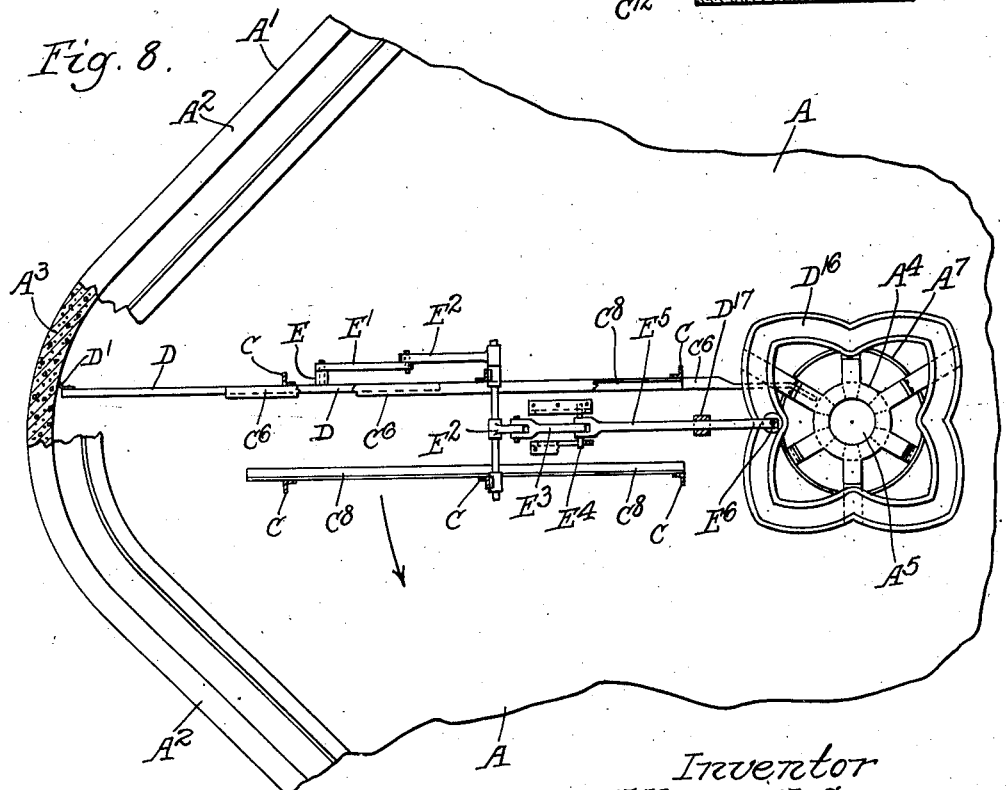
Figure 8 is a plan view of the device of Figure 7 with parts omitted.

In the modified form shown in Figures 7 and 8, the only difference is that the auxiliary screed is provided at its rear end with a bracket E. A connecting rod $E^1$ is pivoted to that bracket. A lever $E^2$ pivoted on the bridge has its short end in pivot relation with a link $E^3$. The other end of which is pivoted to a cross head $E^4$ which cross head is reciprocated by means of a connecting rod $E^5$ driven by the roller $E^6$ in mesh with the cam slot.

The channel F extending about the periphery of the tank adjacent the upper boundary of the wall has an adjustable weir $F^1$. Effluent passing over this weir flows about the periphery of this tank through this channel and is discharged through the effluent pipe $F^2$.

It will be understood that the floor of the tank may be as shown in the drawings flat and level or it might be slightly inclined from the outside walls toward the center discharge sludge collecting hopper, or it may have an inclined sloping floor up from the sludge hopper, or it may be inclined upward and outward from the center pier part or all the way to the nearest side walls and flat or level from the point beyond where the inclined portion intersects the flat portion, from which point the floor would be flat or level the balance of the way to the walls, without departing materially from the spirit of my invention.

It will be understood that the revolving bridge may be supported wholly on a center pedestal in which case the counterweight would be used as indicated without the circular track. Or it may be that by moving the counterweight, the weight may be increased as supported on the circular track or again if it should happen that two diametrically opposed bridges were used, they would counterbalance one another and here again if desired, the central track and the separate counterweight might be omitted. Of course, there might be more than two of such bridges, it being understood that in each case no matter how many bridges were used, there would be a fixed and auxiliary screed associated with each such bridge.

In the modified form shown in Figure 9, I have shown diagrammatically a tank of irregular cross section as at K having a central pivot $K^1$ upon which travels a bridge $K^2$. This bridge carries a flight conveyor $K^3$ and a screed $K^4$. Mounted on the side of the bridge is a supporting structure $K^5$ in which is slidably mounted an auxiliary screed $K^6$. A similar mechanism to that shown in Figure 1 causes the auxiliary screed $K^6$ to reciprocate in unison with the rotation of the bridge as in the preferred form, the difference being that the screed $K^6$ is forwardly inclined with respect to the sweeping mechanism and bridge and so exerts an effect tending to force material in that part of the tank not reached by the main screed and conveyor mechanism both forwardly and inwardly.

I have shown the screed and the conveyor flights both as terminating slightly above the bottom of the tank. Clearly they might under some circumstances actually come in contact with it and I have shown flexible squeegee strips on the screeds which strips bridge the gap, slight as it may be, between the screeds and the tank floor. Clearly such squeegee strips might be used on the flight conveyors if need be or they might be omitted.

It will be understood, of course, that my device is one wherein the extensible screed is projected along generally radial lines as distinguished from a screed which rotates outwardly. In other words, it is the distinction between a swinging and a sliding door. Of course, it will be understood where I have used the words radial lines, I am using them broadly.

My invention relating as it does to the handling of settling material, I have used the term settling in a rather general and broad sense. The conveyor works on material which may have actually settled or on material which is in the process of settling and by settling in the specification and claims, I want it understood that I refer to material which has actually settled out or settled down upon the bottom of the tank.

It will be understood that the scraper blade associated with the cover plate is necessary on the bottom or in the absence of the conical deflector is necessary on the top because we are likely to have an accumulation of settling material heavier than the liquid on any horizontal surface which is exposed to it and we are likely to have the deposit of other material on the underside of any horizontal surface, this latter material very likely being grease, fat and such material. All such materials must be kept in motion and removed from the point where they are collected to prevent septic action.

By the use of the term polygonal, it will be understood that I am referring to something non-circular. The invention has to do with a tank of cross sectional area other than circular. It may be rectangular, it may be octagonal or it may be merely irregular.

I claim:

1. Means for sweeping areas of polygonal cross section comprising a main sweeping member mounted for rotation about an axis within the area and intersecting the longitudinal axis of the member, auxiliary sweeping means associated with the main sweeping means and means removed from the periphery of the area for projecting and retracting the auxiliary means along a path parallel with the longitudinal axis thereof, and in substantial prolongation thereof in consonance with the rotation of the main means whereby the auxiliary means sweeps that portion of the area unswept by the main means.

2. Means for sweeping areas of polygonal cross section comprising a main sweeping member mounted for rotation about an axis within the area and intersecting the longitudinal axis of the member, auxiliary sweeping means associated with the main sweeping means and cam means removed from the periphery of the area for projecting and retracting the auxiliary means along a path parallel with the longitudinal axis thereof and in substantial prolongation thereof in consonance with the rotation of the main means whereby the auxiliary means sweeps that portion of the area unswept by the main means.

3. Means for sweeping areas of polygonal cross section comprising a main sweeping member mounted for rotation about an axis within the area and intersecting the longitudinal axis of the member, auxiliary sweeping means associated with the main sweeping means and cam means located adjacent the center of rotation of the main sweeping member for projecting and retracting the auxiliary means along a path parallel with the longitudinal axis thereof and in substantial prolongation thereof in consonance with the rotation of the main means whereby the auxiliary means sweeps that portion of the area unswept by the main means.

4. Means for sweeping areas of polygonal cross section comprising a main sweeping member mounted for rotation about an axis within the area and intersecting the longitudinal axis of the member, auxiliary sweeping means associated with the main sweeping means and cam means located adjacent the center of rotation of the main sweeping member for projecting and retracting the auxiliary means along a path parallel with the longitudinal axis thereof and in substantial prolongation thereof in consonance with the rotation of the main means whereby the auxiliary means sweeps that portion of the area unswept by the main means, means interposed between the cam and the auxiliary sweeping means for multiplying the effect of the cam.

5. In combination, a settling tank of polygonal cross sectional area, a main sweeping member mounted for rotation about an axis within the tank, auxiliary means associated with the main member for sweeping that portion of the tank not reached by the main member and means located adjacent the center of rotation of the main member for both extending and retracting the auxiliary means along radial lines in conformity with the shape of the area to be swept.

6. In combination, a settling tank of polygonal cross sectional area, a main sweeping member mounted for rotation about an axis within the tank, auxiliary means associated with the main member for sweeping that portion of the tank not reached by the main member and cam means located adjacent the center of rotation of the main member for extending and retracting the auxiliary means along radial lines in conformity with the shape of the area to be swept.

7. In combination, a settling tank of polygonal cross sectional area, a main sweeping member mounted for rotation about an axis within the tank, auxiliary means associated with the main member and adapted to be extended to sweep that portion of the tank not reached by the main member and a cam adapted to control the excursion of the auxiliary means whereby as the sweeping member rotates the auxiliary means is caused to cover all the area not swept by the main sweeping member.

8. Cleaning means for settling tanks and the like comprising a laterally movable conveyor support, a conveyor carried thereby and adapted to propel material therealong and an auxiliary means projecting beyond and movable with the support for bringing material into the zone of operation of the conveyor.

9. Sweeping means for non-circular tanks and the like comprising a bridge, a support therefor within the area of the tank, a circular track concentric with the support, the bridge being adapted to be supported and travel therealong, sweeping means carried by the bridge and auxiliary sweeping means carried by the bridge and means for projecting and retracting the auxiliary sweeping means as the bridge rotates to cause such means to sweep that portion of the tank removed from the path of the main sweeping means.

10. Sweeping means for non-circular tanks and the like comprising a bridge, a support therefor within the area of the tank, a circular track concentric with the support, the bridge being adapted to be supported and travel therealong, sweeping means carried by the bridge and auxiliary sweeping means carried by the bridge and cam operated means for projecting and retracting the auxiliary sweeping means as the bridge rotates to cause such means to sweep that portion of the tank removed from the path of the main sweeping means.

11. Sweeping means for non-circular tanks and the like comprising a bridge, a support therefor within the area of the tank, a track surrounding the support, the bridge being adapted to be supported on and travel therealong, sweeping means carried by the bridge, auxiliary sweeping means carried by the bridge and means independent of the track for projecting and retracting the auxiliary sweeping means as the bridge rotates to cause such auxiliary means to sweep that portion of the tank removed from the path of the main sweeping means.

12. Sweeping means for non-circular tanks and the like comprising a bridge, a support therefor within the area of the tank, a track surrounding the support, the bridge being adapted to be supported on and travel therealong, sweeping means carried by the bridge, auxiliary sweeping means carried by the bridge and means independent of the track for projecting and retracting the auxiliary sweeping means as the bridge rotates to cause such auxiliary means to sweep that portion of the tank removed from the path of the main sweeping means, said projecting means comprising a cam and a motion multiplying device interposed between the cam and the auxiliary sweeping means.

13. Sweeping means for non-circular tanks and the like comprising a bridge, a support therefor within the area of the tank, a track surrounding the support, the bridge being adapted to be supported on and travel therealong, sweeping means carried by the bridge, auxiliary sweeping means carried by the bridge and means independent of the track for projecting and retracting the auxiliary sweeping means as the bridge rotates to cause such auxiliary means to sweep that portion of the tank removed from the path of the main sweeping means, said projecting means comprising a cam and a motion multiplying device interposed between the cam and the auxiliary sweeping means, said motion multiplying device comprising a rack fixed on the bridge, a gear adapted to travel along the rack, a driving connection between the cam and the gear, a movable rack in mesh with the gear and a driving connection between the movable rack and the auxiliary sweeping means.

14. Sweeping means for non-circular tanks and the like comprising a bridge, a support therefor within the area of the tank, a track surrounding the support, the bridge being adapted to be supported on and travel therealong, sweeping means carried by the bridge, auxiliary sweeping means carried by the bridge and means independent of the track for projecting and retracting the auxiliary sweeping means as the bridge rotates to cause such auxiliary means to sweep that portion of the tank removed from the path of the main sweeping means, said projecting means comprising a cam and a motion multiplying device interposed between the cam and the auxiliary sweeping means, said means comprising a cam, a cam roller engaging the cam, a connecting rod driven by the roller, a lever, one end of which is in pivotal connection with the connecting rod, a link pivoted to the other end of the lever at one end and pivoted to the auxiliary sweeping means at the other end.

15. In combination, a tank of polygonal cross sectional area, means mounted for rotation and adapted to sweep a circular area therein, a conveyor associated with such means adapted to positively propel material inwardly along radial lines toward the center of rotation, auxiliary sweeping means mounted upon and adapted to project beyond the sweeping means and propel material from the area outside of the circular swept area into the zone of operation of the conveyor.

16. In combination, a tank of polygonal cross sectional area, means mounted for rotation and adapted to sweep a circular area therein, a conveyor associated with such means adapted to positively propel material inwardly along radial lines toward the center of rotation, auxiliary sweeping means adapted to project beyond the sweeping means and propel material from the area outside of the circular swept area into the zone of operation of the conveyor, and means located adjacent the center of rotation of the main sweeping means adapted to project and retract the auxiliary sweeping means along radial lines in consonance with the angular position of the main sweeping means whereby the auxiliary sweeping means sweep substantially the entire area of the tank outside of the circular swept area.

17. In combination, a tank of polygonal cross sectional area, means mounted for rotation and adapted to sweep a circular area therein, a conveyor associated with such means adapted to positively propel material inwardly along radial lines toward the center of rotation, auxiliary sweeping means adapted to project beyond the sweeping means and propel material from the area outside of the circular swept area into the zone of operation of the conveyor, and means located adjacent the center of rotation of the main sweeping means adapted to project and retract the auxiliary sweeping means in consonance with the angular position of the main sweeping means whereby the auxiliary sweeping means sweep substantially the entire area of the tank outside of the circular swept area.

18. In combination, a tank of polygonal cross sectional area, means mounted for rotation and adapted to sweep a circular area therein, a conveyor associated with such means adapted to positively propel material inwardly along radial lines toward the center of rotation, auxiliary sweeping means adapted to project beyond the sweeping means and propel material from the area outside of the circular swept area into the zone of operation of the conveyor, and means including a cam located adjacent the center of rotation of the main sweeping means adapted to project and retract the auxiliary sweeping means along radial lines in consonance with the angular position of the main sweeping means whereby the auxiliary sweeping means sweep substantially the entire area of the tank outside of the circular swept area.

19. In combination, a tank of polygonal cross sectional area, means mounted for rotation and adapted to sweep a circular area therein, a conveyor associated with such means adapted to positively propel material inwardly along radial lines toward the center of rotation, auxiliary sweeping means adapted to project beyond the sweeping means and propel material from the area outside of the circular swept area into the zone of operation of the conveyor, and means including a cam located adjacent the center of rotation of the main sweeping means adapted to project and retract the auxiliary sweeping means in consonance with the angular position of the main sweeping means whereby the auxiliary sweeping means sweep substantially the entire area of the tank outside of the circular swept area.

20. In combination, a tank having a non-circular horizontal cross section, means contained within the tank and adapted to sweep a circular area therein, means associated with the sweeping means for positively propelling material adjacent the bottom of the tank inwardly toward the center of the circle along radial lines, means associated with the sweeping means and controlled adjacent the center of rotation thereof for sweeping material from that part of the tank area located beyond the circle and conveying such material inwardly into the zone of operation of the propelling means.

21. In combination, a tank having an irregular horizontal cross sectional area, sweeping means within the tank adapted to travel about a center of rotation therein and cover a circular area, a conveyor associated with the sweeping means for positively propelling material adjacent the bottom of the tank inwardly along radial lines toward the center of rotation of the sweeping means and means mounted upon the sweeping means and independent of the peripheral walls of the tank for conveying material from that portion of the bottom of the tank outside the areas swept by the sweeping means into the zone of operation of the conveyor.

22. In combination, a tank having a generally horizontal floor, means mounted for rotation about an axis contained therein adapted to sweep a circular area of the tank floor, a conveyor associated with the sweeping means and adapted to positively propel material adjacent the floor of the tank inwardly along radial lines toward the center of rotation of the sweeping means, auxiliary sweeping means associated with the main sweeping means, projecting beyond the conveyor and adapted to sweep material adjacent the floor of the tank outside the central circular swept area and propel such material into the zone of operation of the conveyor, said auxiliary sweeping means comprising a screed adapted for reciprocating movement in prolongation of the main sweeping means and means located within and spaced from the outside wall of the tank, for advancing and retracting said auxiliary sweeping means in consonance with the rotation of the main means whereby said auxiliary sweeping means are projected outwardly substantially to the outside walls of the tank at all angular positions of said sweeping means.

23. In combination, a tank of polygonal cross sectional area, means mounted for rotation and adapted to sweep a circular area therein, a conveyor mounted upon such means adapted to positively propel material inwardly along radial lines toward the center of rotation, auxiliary sweeping means adapted for radial movement with respect to the center of rotation and to project beyond the outer end of the conveyor and sweeping means and to propel material from the area outside of the circular swept area into the zone of operation of the conveyor.

WILLIAM W. SAYERS.